(12) United States Patent
Kline

(10) Patent No.: US 8,055,539 B1
(45) Date of Patent: Nov. 8, 2011

(54) SYSTEM AND METHOD FOR TRACKING INTERNET RELATED REVENUE

(76) Inventor: Ladd M. Kline, Winter Haven, FL (US)

( * ) Notice: Subject to any disclaimer, the term of this patent is extended or adjusted under 35 U.S.C. 154(b) by 1103 days.

(21) Appl. No.: 11/527,043

(22) Filed: Sep. 26, 2006

(51) Int. Cl.
*G06Q 30/00* (2006.01)

(52) U.S. Cl. ............... 705/14.49; 705/14.53; 705/14.15

(58) Field of Classification Search .................. 705/10, 705/14, 14.49, 14.53, 14.15
See application file for complete search history.

(56) References Cited

U.S. PATENT DOCUMENTS

| | | | |
|---|---|---|---|
| 6,853,979 B1* | 2/2005 | Bass | 705/26 |
| 6,968,513 B1* | 11/2005 | Rinebold et al. | 715/854 |
| 7,142,843 B2* | 11/2006 | Dowling et al. | 455/414.1 |
| 2002/0087420 A1* | 7/2002 | Higgins et al. | 705/26 |
| 2003/0146891 A1* | 8/2003 | Poliakine | 345/87 |
| 2003/0179229 A1* | 9/2003 | Van Erlach et al. | 345/744 |
| 2004/0006510 A1 | 1/2004 | Lertzman et al. | |
| 2004/0078305 A1* | 4/2004 | Weller | 705/27 |
| 2004/0260606 A1* | 12/2004 | Emalfarb | 705/14 |
| 2005/0060241 A1 | 3/2005 | Williams | |
| 2005/0104366 A1 | 5/2005 | McClintock | |
| 2005/0149419 A1 | 7/2005 | Blumberg et al. | |
| 2005/0171838 A1* | 8/2005 | Eglinton | 705/14 |
| 2005/0177421 A1* | 8/2005 | Fujimoto | 705/14 |
| 2005/0216475 A1 | 9/2005 | Overton | |
| 2005/0229451 A1* | 10/2005 | Mullens et al. | 40/500 |
| 2005/0289015 A1* | 12/2005 | Hunter et al. | 705/27 |
| 2006/0080875 A1 | 4/2006 | Nelson et al. | |
| 2006/0085208 A1 | 4/2006 | Nelson et al. | |
| 2006/0126556 A1* | 6/2006 | Jiang et al. | 370/328 |
| 2006/0194572 A1* | 8/2006 | Fresonke et al. | 455/414.1 |
| 2007/0288433 A1* | 12/2007 | Gupta et al. | 707/3 |
| 2008/0002892 A1* | 1/2008 | Jelonek et al. | 382/224 |

FOREIGN PATENT DOCUMENTS

| | | | |
|---|---|---|---|
| JP | 2002269315MT | * | 3/2001 |
| JP | 2001256373 | | 9/2001 |
| JP | 2001256373MT | * | 9/2001 |
| JP | 2002269315 | | 9/2002 |

* cited by examiner

*Primary Examiner* — John G. Weiss
*Assistant Examiner* — Adam Chornesky
(74) *Attorney, Agent, or Firm* — Simpson & Simpson, PLLC

(57) ABSTRACT

The invention broadly comprises a computer-based method for tracking Internet-related revenue, including: recording, in an Internet-based system, a sign obtained from a business entity; correlating a first item purchased through the system with the sign; and compensating the business entity for the purchase of the first item. The registering, correlating, and compensating are performed by at least one specially programmed general-purpose computer. In some aspects, the sign is regarding an offer to sell a second item. In some aspects, the second item is real estate. The invention further broadly comprises a computer-based system for tracking Internet-related revenue, including: registration, posting, tracking, and assignment elements to: register, in an Internet-based system, a sign advertising an item for sale, obtained from a retail establishment; post the item in the system; track revenue from the system in response to the posting; and assign a portion of the revenue to the retail establishment, respectively.

10 Claims, 8 Drawing Sheets

SYSTEM AND METHOD FOR TRACKING INTERNET RELATED REVENUE

FIELD OF THE INVENTION

The invention relates generally to distribution of revenues generated by on-line Internet sales. In particular, the invention relates to a method and system for tracking downstream Internet sales associated with an item initially purchased from a retail enterprise. Even more particularly, the invention compensates a retailer selling a "For Sale" sign for downstream Internet-generated revenue associated with the sign.

BACKGROUND OF THE INVENTION

It is known to track business referrals and subsequent income on the Internet. However, to date, retailers providing signs or other tangible items that eventually lead to downstream sales on the Internet have not been compensated beyond the initial purchase of the sign or tangible item. For example, U.S. Pat. No. 6,968,513 B1 (Rinebold) discloses an online interactive system comprising a business referral and income generation system linked to one or more listed websites of businesses in a particular locality. Revenue is generated by way of such methods as: merchants listing their web sites in one or more web site directories for multiple communities; banner ads; local and national coupons issued by merchants; classified job listings; classified realty listings; "4 Sale" ads; and fees for supplemental services called "Extended Services" serving to provide interactive capabilities to static web sites. The system enables accounting of and compensation of authorized agents of the system who refer advertisers. The agents use an identifying account number to order advertising services online at the system. Once a client places an ad, listing or coupon using an agent's identification number, the agent is compensated by receiving a referral fee based on the revenue generated to the system, as a result of the client ordering advertising services from the system.

Unfortunately, Rinebold makes no provision for retailers. This invention creates a referral system whereby an agent is compensated for online revenue that they helped create with some type of sales activity. However, the agents in this invention do not sell "For Sale" signs or any other tangible product; they sell advertising space on the website either directly or with coupons. The coupons have an account number that identifies the agent and affords the tracking of any revenue generated by the use of the coupon. The agent is then compensated for the revenue that stems from the use of the coupon. The distributor of the coupon is compensated if and when such an individual pays for listing their personal property that they wish to sell.

Thus, Rinebold does not disclose a compensation process based on the sale of a tangible item, specifically, a "For Sale" sign, and correlation of the tangible item with an Internet site. In contrast, the compensation process in Rinebold is based on coupons or other advertising elements (i.e., not a tangible product from a retailer) that are related to an Internet site and is initialized by the purchase of the advertising element. Alternately stated, Rinebold does not teach incremental revenue and Rinebold's activities are completely linked to an Internet site and there is no sale of a marketable commodity could serve as the catalyst for generating incremental revenue.

U.S. Pat. No. 6,853,979 B1 (Bass) discloses a method of marketing a good or service which includes a "For Sale" sign that has a preprinted website address on it. Sellers of a good or service can post information about the good or service on the website. Consumers can visit the website to view the information by reference to a unique identifier, such as a number, listed on the sign. The website may be adapted to allow consumers to browse all available goods within a particular category. The website owner may charge a fee to the seller, consumer, or both. The website may also be adapted such the sale of the product is consummated online, the provider receives payment from the buyer and then forwards the payment to the seller. The provider may then deduct a fee for this service.

Unfortunately, Bass only teaches compensating parties involved in an Internet transaction and does not teach compensating the retailer of the "For Sale" sign or other tangible product for incremental revenue generated by the sale of the product. It does not teach or suggest the generation of revenue other than the sale of the product to be listed by the seller and the possible fee that may be charged to the seller or buyer who uses the online service. Thus, the only compensation that is taught by this patent is the fee that the website provider might collect.

U.S. Patent Application No. 2004/0078305 A1 (Weller) discloses a product tracking and income distribution method that determines, via a code, which store and/or sales representative assisted with a product sale that a consumer purchased over the Internet. The apparatus uses an Internet site with a database for storing codes that retrieves and holds detailed product information, retailer profiles, and potential representative's identities. When a consumer views a product within a traditional retail store and is interested in buying the product, a master code is generated by the store that details the store profile, product details, and sales representative (if applicable) involved with the product viewing. The consumer uses the code and places an order online. The code utilized by the consumer ensures the store earns a preprogrammed viewing fee and the sales representative earns his/her commissions from the predetermined commission of the product code purchase.

Unfortunately, Weller teaches "tracking," on the Internet, a sale of a product offered by a retailer, but does not have any teachings regarding downstream sales activities. Instead, Weller only teaches compensating an employee of the retailer for a product sold by the retailer (via the Internet).

U.S. Patent Application No. 2005/0171838 (Eglinton) discloses an internet-based and tangible referral system that enables individuals and other business entities to market products in return for compensation which is paid as a result from any sale or sales lead that is generated by the individual or business entity. A uniquely modified version of the printed web page or electronically transferred document, which explicitly or non-explicitly identifies the relationship or the offer, is instrumental to the tracking and fulfillment of commissions paid to the individual or business entity.

Unfortunately, Eglinton teaches businesses utilizing a website and associated software to facilitate the online sale of their products or services by compensating individuals who print and distribute/display advertisements for their business, but does not address items sold by a retail establishment.

In general, a retailer is not able to financially participate in revenues generated via the Internet for a product sold by the retailer, for example, a real estate "For Sale" sign. In fact, it is possible that a retailer may sell a product that contains advertising or promotions for competitors of the retailer.

Thus, there is a long-felt need to provide a method and system for compensating a retail establishment for downstream Internet revenue associated with an item sold by the establishment, in particular, a "For Sale" sign.

SUMMARY OF THE INVENTION

The present invention broadly comprises a computer-based method for tracking Internet-related revenue, including the steps of: registering, in an Internet-based system, a sign obtained from a first business entity; correlating a first item purchased through the Internet-based system with the sign; and compensating the first business entity for the purchase of the first item. The steps of registering, correlating, and compensating are performed by at least one general-purpose computer specially programmed to perform the steps of registering, correlating, and compensating. In some aspects, the sign is regarding an offer to sell a second item. In some aspects, the second item is real estate.

In some aspects, the method includes directing advertising to a first party in response to the first party accessing the Internet-based system regarding the second item, the advertising is specific to the first business entity and the directing is performed by the at least one general-purpose computer. In some aspects, the second item is real estate and the method includes: compiling information regarding a buyer, seller, or owner of the real estate. The advertising is specific to the first business entity and the steps of compiling and directing are performed by the at least one general-purpose computer.

In some aspects, the method includes correlating a user, who purchases the first item, with the registration and the step of correlating is performed by the at least one general-purpose computer. In some aspects, the method displays the first item through the Internet-based system, the first item is associated with the second item and the step of displaying is performed by the at least one general-purpose computer. In some aspects, the method includes assigning a code to the sign, the code identifying the first business entity, and registering a sign includes registering the code. The step of assigning is performed by the at least one general-purpose computer. In some aspects, a second business entity receives payment for the purchase of the first item and provides the compensation.

In some aspects, the method includes displaying advertising from a plurality of business entities on the Internet-based system in response to the registration, the plurality of business entities includes a plurality of business categories, and the first item is purchased from a business entity in the plurality of business entities. Then correlating a first item purchased through the Internet-based system with the registration includes correlating the first item with respect to the business categories and the step of displaying is performed by the at least one general-purpose computer.

The present invention also broadly comprises a computer-based method for tracking Internet-related revenue, including the steps of recording, in an Internet-based system, a sign obtained from a business entity, the sign regarding sale of real estate; advertising the real estate in the Internet-based system; directing advertising to a party in response to the party accessing the Internet-based system regarding the real estate, wherein the advertising is specific to the business entity; identifying an item purchased through the Internet-based system by the party; and compensating the business entity for the purchase of the item. The steps of recording, advertising, directing, identifying, and compensating are performed by at least one general-purpose computer specially programmed to perform the steps of recording, advertising, directing, identifying, and compensating.

The present invention further broadly comprises a computer-based method for tracking Internet-related revenue, including the steps of: registering, in an Internet-based system, a sign obtained from a retail establishment, the sign advertising an item for sale; posting the item in the system; generating revenue in the Internet-based system in response to the posting; and assigning a portion of the revenue to the retail establishment. The steps of registering, posting, generating, and assigning are performed by at least one general-purpose computer specially programmed to perform the steps of registering, posting, generating, and assigning.

The present invention broadly comprises a computer-based system for tracking Internet-related revenue, including: a registration element, in an Internet-based system, arranged to register a sign obtained from a first business entity; a first correlation element arranged to correlate a first item purchased through the Internet-based system with the sign; and a first compensation element arranged to compensate the first business entity for the purchase of the first item. The registration, first correlation, and first compensation elements are disposed in at least one specially-programmed general-purpose computer. In some aspects, the sign is regarding an offer to sell a second item. In some aspects, the second item is real estate.

In some aspects, the system includes an advertisement element arranged to direct advertising to a first party in response to the first party accessing the Internet-based system regarding the second item, the advertising is specific to the first business entity, and the advertisement element is disposed in the at least one specially programmed computer. In some aspects, the second item is real estate and the system includes: a compilation element arranged to compile information regarding a buyer, seller, or owner of the real estate; and an advertisement element arranged to direct advertising to the entity responsive to the compiled information. The advertising is specific to the first business entity and the compilation and advertisement elements are disposed in the at least one specially programmed computer.

In some aspects, the system includes a second correlation element arranged to correlate a user of the Internet-based system with the registration of the first item, the user purchasing the first item through the Internet-based system. The second correlation element is disposed in the at least one specially programmed computer. In some aspects, the system includes a display element arranged to display the first item through the Internet-based system and the display element is disposed in the at least one specially programmed computer. In some aspects, the system includes an assignation element arranged to assign a code to the sign, the code identifying the first business entity, and the registration element is arranged to register the code. The assignation element is disposed in the at least one specially programmed computer.

In some aspects, a second business entity receives payment for the purchase of the second item and provides the compensation through the first compensation element. In some aspects, the system includes an advertisement element arranged to display advertising from a plurality of business entities on the Internet-based system in response to the registration element. The plurality of business entities comprises a plurality of business categories and the first item is purchased from a business entity in the plurality of business entities. The first correlation element is arranged to correlate the first item with respect to the business categories and the advertisement element is disposed in the at least one specially programmed computer.

The present invention also broadly comprises a computer-based system for tracking Internet-related revenue, including: a recordation element arranged to record, in an Internet-based system, a sign obtained from a business entity, the sign regarding sale of real estate; a first advertisement element arranged to advertise the real estate in the Internet-based system; a second advertisement element arranged to arranged to direct advertising to a party in response to the party accessing the Internet-based system regarding the real estate, where the advertising is specific to the business entity; an identification element arranged to identify an item purchased by the party through the Internet-based system; and a compensating element arranged to compensate the business entity for the purchase of the item. The recordation, first and second advertisement, identification, and compensation elements are disposed in at least one specially programmed general-purpose computer.

The invention further broadly comprises a computer-based system for tracking Internet-related revenue, including: a registration element arranged to register, in an Internet-based system, a sign obtained from a retail establishment, the sign advertising an item for sale; a posting element arranged to post the item in the system; a tracking element arranged to track revenue generated in the Internet-based system in response to the posting; and an assignation element arranged to assign a portion of the revenue to the retail establishment. The registration, posting, tracking, and assignation elements are disposed in at least one specially programmed general-purpose computer.

It is a general object of the present invention to provide a system and method for compensating a retail establishment for downsteam Internet-based sales associated with a product obtained from the retail establishment.

It is another object of the present invention to provide a branded transaction enabling retailers to participate in the full revenue stream associated with a product, such as a "For Sale" sign or kit including such sign, obtained from the retailer.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
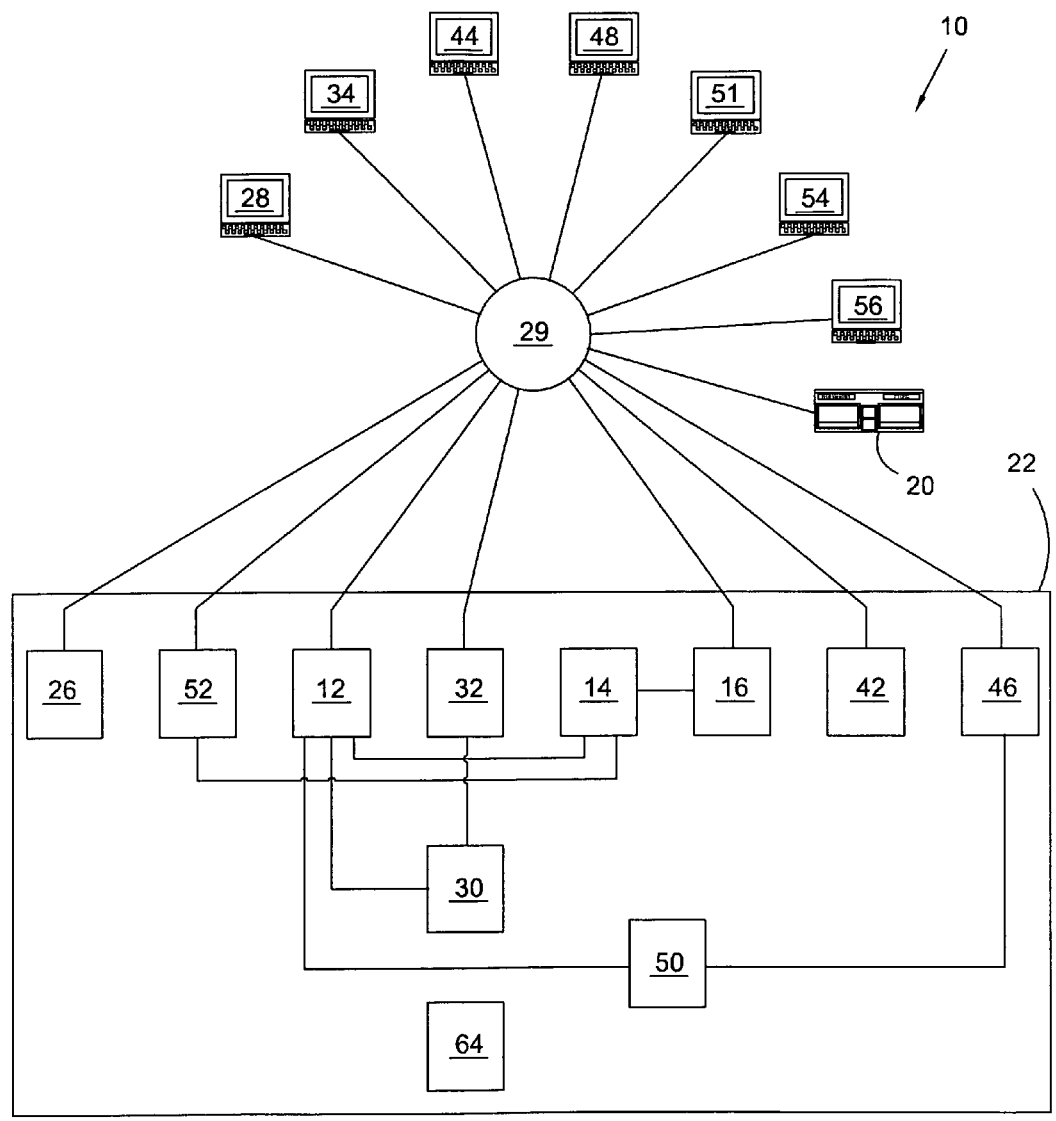
FIG. 1 is a block diagram of a present invention computer-based system for tracking Internet-related revenue.

FIG. 1 is a block diagram of present invention computer-based system 10 for tracking Internet-related revenue. System 10 includes registration, or recordation, element 12, correlation element 14, and compensation element 16. Recordation element 12 is arranged to record, in system 10, a sign, or sign kit, (not shown) obtained from business entity 20. By register or record, we mean that element 12 accepts data or identifying information regarding the sign, or the purchase of the sign, and makes a record of the sign or purchase for later use by system 10. Alternately stated, the system registers the identifying data within the system. The registration can be accomplished using any means known in the art. In some aspects, element 12 includes or is connected to a database (not shown) for storing the data or information. By obtained, we mean that the sign was purchased from the business entity or otherwise provided by the business entity. For example, the sign could be provided without charge and/or with an incentive. It should be understood that a present invention system is not limited to any particular means for the business entity to provide the sign. Alternately stated, a sign obtained from a business entity by any means known in the art can be used with a present invention system.

Correlation element 14 is arranged to correlate a first item (not shown), purchased through Internet-based system 10, with the sign, for example, correlating the purchase with the recordation of the sign in element 14. That is, element 14 recognizes or tracks the purchase of an item through system 10 and as appropriate, connects the purchase of the item to the sign via the recordation in element 14. This process is further described below. Compensation element 16 is arranged to compensate business entity 20 for the purchase of the item. The recordation, correlation, and compensation elements are disposed in at least one specially-programmed general-purpose computer 22.

In some aspects, business entity 20 is an establishment with a physical location or building, for example, a department store or building supply store. That is, business 20 is a "bricks and mortar" establishment. In some aspects, business 20 is an Internet-based entity or otherwise interfaces with clients outside of the setting of a physical location or building, for example, business 20 could be a catalog operation that accepts orders via the Internet or telephone and ships merchandise, such as the sign, to a buyer's location, without the necessity of the buyer visiting a physical location or building. In some aspects, the main function of business 20 may not be retailing. However, at least with respect to the sign, business entity 20 functions in a retail capacity.

In some aspects, the sign is regarding an offer to sell a second item. For example, the sign is a "For Sale" sign for the second item. In some aspects, the second item is real estate, for example, a home or residence. In the descriptions that follow, a residence, or home, is used as an example of the second item. However, it should be understood that system 10 is not limited to an offer to sell any particular type of item, and in particular is not limited to an offer to sell any particular type of real estate.

In some aspects, system 10 includes advertisement element 26 arranged to direct advertising to a first party (not shown) in response to the party accessing Internet-based system 10 regarding the residence. Advantageously, the advertising is specific to business entity 20. The party can be any individual or organization and the party can access system 10 by any means known in the art, for example, using computer 28 to access Internet 29.

In some aspects, system 10 includes compilation element 30 and advertisement element 32. Element 30 is arranged to compile information regarding a buyer, seller, and/or owner (not shown) of the home and element 32 is arranged to direct advertising to the buyer, seller, and/or owner of the home responsive to the information compiled by element 30. Advantageously, the advertising is specific to business 20. In some aspects, the compilation element obtains the information from recordation element 12. The buyer, seller, or owner can access system 10 by any means known in the art, for example, computer 34.

In some aspects, system 10 includes display element 42 arranged to display the first item through Internet-based system 10. The display element can display the first item by any means known in the art, for example, computer 44 interfaced with system 10. In some aspects, the first item is associated with the residence. By associated with we mean, for example, that the item is necessary, useful, or desirable with respect to the sale or purchase of the residence. Alternately stated, the first item is linked to the residence in some manner through system 10. It should be understood that there need not be a direct connection between the residence and the first item. For example, a party accessing system 10 to record a sign for a home need not be aware of or connected with the offer for sale or purchase of the first item. Examples of first items associated with a residence include, but are not limited to a: Property Detail Report, Comparable Sales Report; Neighborhood Information; Automated Home Valuation; Flood Map; Parcel Map; Home Appraisal; Home Warranty Insurance; Home Inspection; Home Repair and Maintenance Services; Home Cleaning Services; Newspaper Classified Ad Placement; Sale/Purchase Contracts; Legal Services; Mortgages; and Time Extensions for Listings. It should be understood that the first item is not limited to the preceding examples and that the display of other products and services is included within the spirit and scope of the claimed invention.

In some aspects, system 10 includes assignation element 46 arranged to assign a code to the sign. The code identifies business entity 20 and recordation element 12 is arranged to record the code. Any means known in the art can be used to assign the code. In some aspects, element 46 interfaces through the Internet. In some aspects, the sign includes a nominal amount of information including the code to be entered by a second party (not shown). In general, the second party is associated with the purchase of the sign, but it not necessary for the second party to literally have purchased the sign. The second party can be any individual or organization accessing system 10 to record the sign. The second party can access system 10 using any means known in the art, for example, Internet 29 and computer 48. In some aspects, system 10 includes user administration element 50 that activates an account for the second party. The account can be established, configured, and maintained using any means known in the art. In some aspects, recordation element 12 or administration element 50 correlates the second party with the code associated with the sign, enabling or at least facilitating the tracking of downstream Internet revenue associated with the sign. In some aspects, element 50 includes a private mailbox (not shown) for the user.

In some aspects, the sign is part of a kit that includes the code and other information, aids, offers etc., as further described below. The kit can include instructions for logging onto the system through Internet 29 using a password and personal identification number. The kit provides a plethora of benefits to the buyer of the sign, and at least on the basis of the extra information and offers etc., business 20 may be able to charge a higher price for the sign than would otherwise be possible and would thus enjoy increased profits from the sale of the sign.

In some aspects, a business entity (not shown) other than business 20 receives payment for the purchase of the first item and provides compensation to business entity 20, for example, through compensation element 16. The other business entity is interfaced with system 10 by any means known in the art and as necessary to track the sale of the first item and to determine and provide the compensation to business 20. In some aspects, the other business entity is interfaced through computer 51 with system 10, in particular, with elements 12, 14, and 16.

In some aspects, system 10 includes advertisement element 52 arranged to display advertising from a plurality of business entities (not shown) on Internet-based system 10 in response to recordation element 12. That is, in response to entering the sign into system 10, advertising from a group of business entities in displayed. For example, when a party accesses system 10 regarding the sign or the residence, element 52 is notified and responds accordingly with advertisement. In some aspects, the businesses in the plurality of businesses and the advertising messages from the respective businesses are selected according to business entity 20 and the sign. For example, in our example the sign is regarding the home; therefore, businesses in the plurality of businesses and the respective advertising messages can be selected to be geared toward real estate transactions. Further, the businesses in the plurality of businesses and the respective advertising messages can be selected to avoid competition with business 20 or to complement business 20. The plurality of businesses can interface with system 10 using any means known in the art, for example, Internet 29 and computer 54. The advertising can be displayed using any means known in the art, including access to system 10 via Internet 29 and computer 56.

In some aspects, the plurality of business entities are distinguished by respective business categories and when the first item is purchased from a business entity in the plurality of business entities, correlation element 14 correlates the sale of the item with respect to the business categories. Information from advertising elements in system 10, for example, element 32, can be placed in a user's mailbox in element 50.

Thus, system 10 is able to track downstream revenue with respect to categories of interest. For example, for the home, it can be expected that a person logging onto system 10 with respect to the sign or the home is interested in products and services associated with a real estate transaction, such a home inspection, mortgage services, insurance, etc. Therefore, as an example, element 14 enables an analysis of revenue streams associated with a real estate transaction according to the products and services associated with the revenue stream and the analysis can be restricted as desired to a specific record in element 14 or a specific business 20.

System 10 provides a number of advantages to business entity 20 with respect to selling signs, for example, a "For Sale" sign for use in selling the residence. In those aspects in which the sign is part of a kit, as noted above, system 10 increases profit by promoting sale of a more expensive premium owner-assisted real estate marketing kit. Other advantages of a sign or marketing kit include: share in the incremental revenue generated through the direct sale of additional products or services offered online to the customers of system 10, as tracked by system 10; ability to display ad banners, specific to business 20, with respect to real estate listed as a result of an owner-assisted real estate marketing kit being sold through business 20; and access to a database, specific to business 20, of properties and owners for purposes of direct mail marketing, email marketing or telemarketing, for example, special credit card offers or other promotional offers or discounts to property sellers.

In some aspects, system 10 includes administration element 64, which includes an account or accounts for businesses selling signs and interfacing with system 10, for example, business 20. Business 20 can use element 64 to modify parameters of system 10 under control of or at least accessible to business 20. For example, parameters can include, but are not limited to advertising displayed by element 32.

Figure 2:
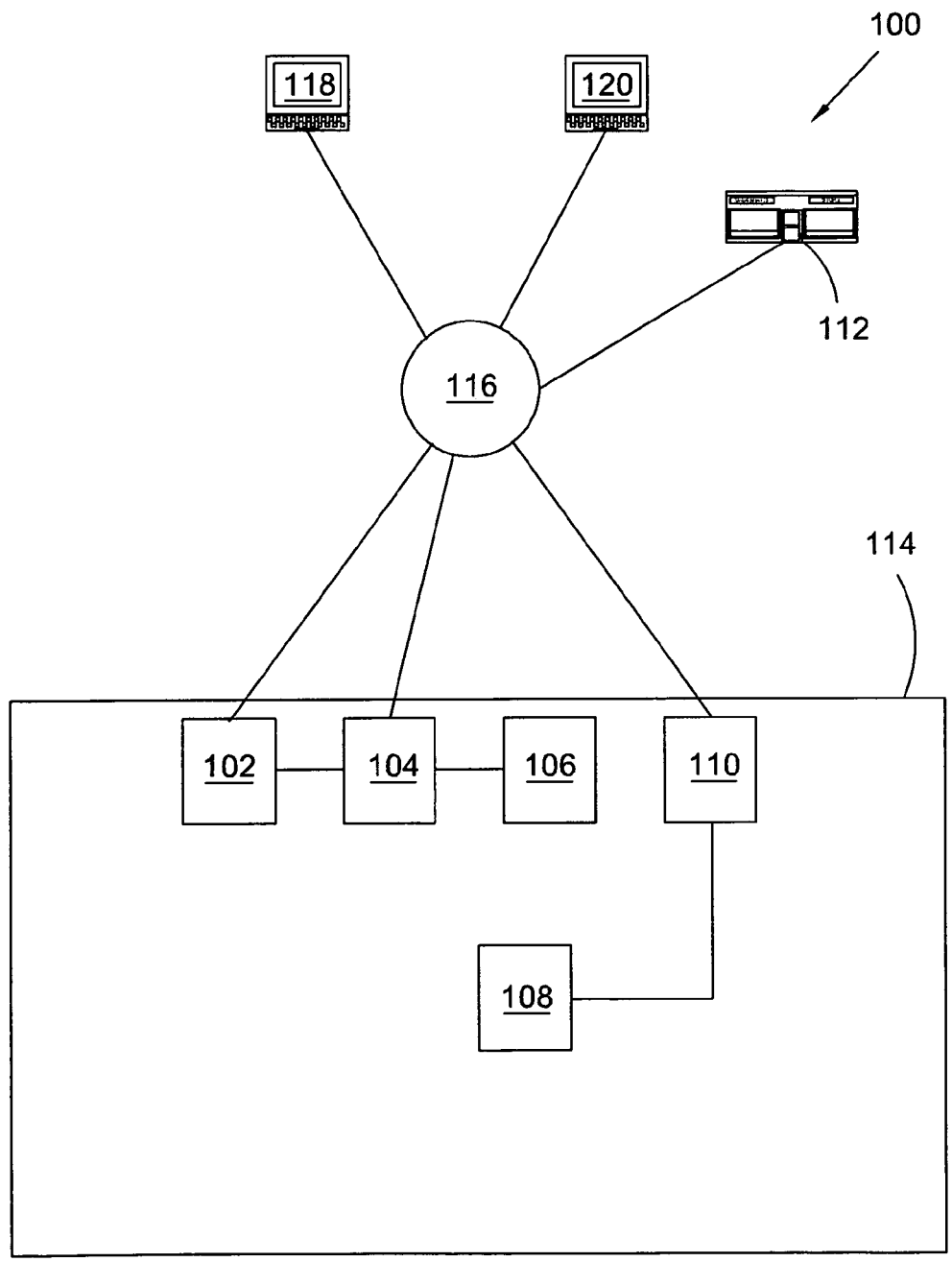
FIG. 2 is a block diagram of a present invention computer-based system for tracking Internet-related revenue.

FIG. 2 is a block diagram of present invention computer-based system 100 for tracking Internet-related revenue.

Figure 3:
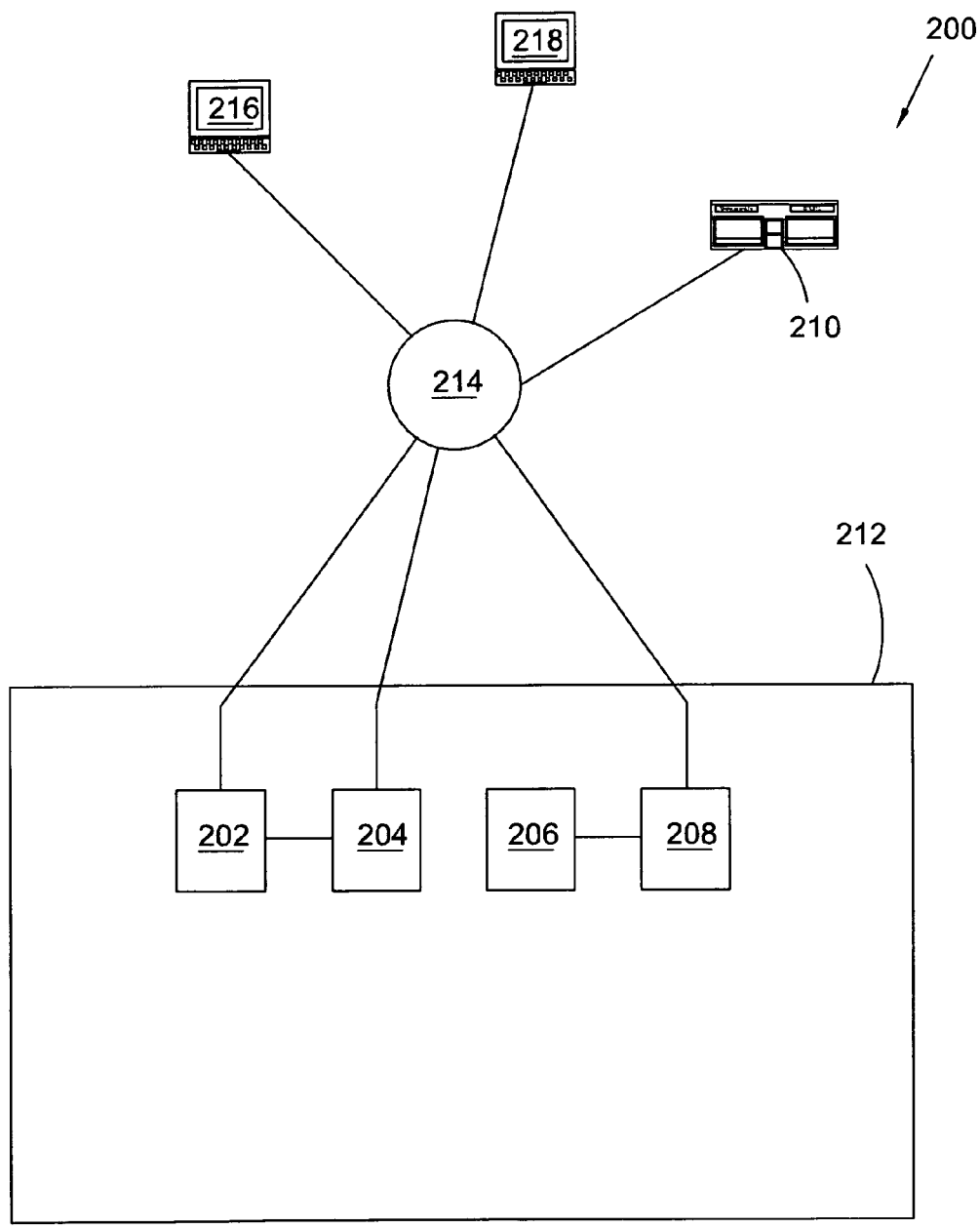
FIG. 3 is a block diagram of a present invention computer-based system for tracking Internet-related revenue.

FIG. 3 is a block diagram of present invention computer-based system 200 for tracking Internet-related revenue.

Figure 4:
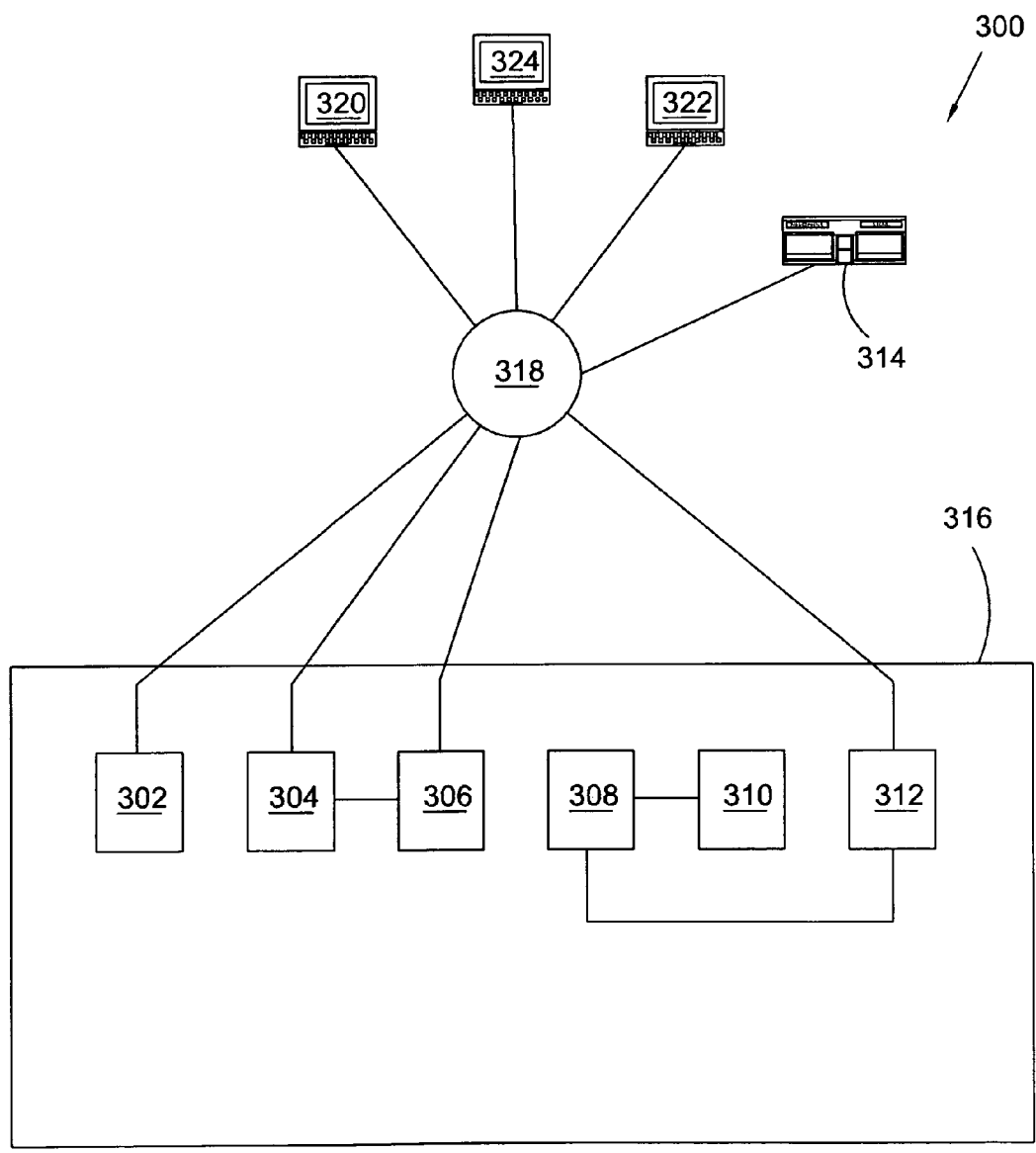
FIG. 4 is a block diagram of a present invention computer-based system for tracking Internet-related revenue.

FIG. 4 is a block diagram of present invention computer-based system 300 for tracking Internet-related revenue. In general, the discussion in the description of FIG. 1 regarding a sign, a business entity selling the sign, a recordation element, and a compensating element is applicable to FIGS. 2 through 4. Returning to FIG. 2, system 100 includes recordation element 102, advertisement element 104, advertisement element 106, identification element 108, and compensation element 110. Recordation element 102 is arranged to record, in system 100, a sign (not shown) purchased from business entity 112, regarding the sale of real estate (not shown). Advertisement element 104 is arranged to advertise the real estate through, or in, system 100. Advertisement element 106 is arranged to direct advertising to a party (not shown) in response to the party accessing system 100 regarding the real estate. The advertising is specific to the business entity. Identification element 108 is arranged to identify an item purchased through system 100 by the party. Compensation element 110 is arranged to compensate the business entity for the purchase of the item. The recordation, advertisement, correlation, and compensation elements are disposed in at least one specially-programmed general-purpose computer 114.

Computer 114 is accessed by any means known in the art, for example, via Internet 116. Recordation element 102 can be accessed by any means known in the art, for example, computer 118 and Internet 114. Advertising element 104 can advertise using any means known in the art, for example, computer 120 and the Internet.

Returning to FIG. 3, system 200 includes registration element 202, posting element 204, tracking element 206, and assignation element 208. The registration element is arranged to register, in Internet-based system 200, a sign (not shown) purchased from retail establishment 210, advertising a first item (not shown) for sale. The posting element is arranged to post the item in, or through, the system. By post we mean that information about the item is made available through system 200. The information can include descriptive material and promotional or sales information. The tracking element is arranged to track revenue generated in Internet-based system 200 in response to the posting. The revenue is from the sale of a second item associated with the first item. For example, if the first item is real estate, the second item can be services or products related to the sale or purchase of the real estate, such as mortgage services. The assignation element is arranged to assign a portion of the revenue to establishment 210. The registration, posting, tracking, and assignation elements are disposed in at least one specially programmed general-purpose computer 212.

Computer 212 is accessed by any means known in the art, for example, via Internet 214. Recordation element 202 can be accessed by any means known in the art, for example, computer 216 and Internet 214. Posting element 204 can post the item using any means known in the art, for example, computer 218 and the Internet.

Returning to FIG. 4, system 300 includes recordation element 302, advertisement element 304, advertisement element 306, identification element 308, correlation element 310, and compensation element 312. The recordation element is arranged to record, in Internet-based system 300, a sign (not shown) purchased from business entity 314, where the sign is regarding a first item (not shown). Advertisement element 304 is arranged to advertise the first item in the Internet-based system. Advertisement element 306 is arranged to display advertising from a plurality of business entities (not shown) on the Internet-based system in response to advertising the first item The plurality of business entities comprises a plurality of business categories. Identification element 308 is arranged to identify a second item purchased through the Internet-based system in response to advertising the first item. The second item is purchased from a second business entity in the plurality of business entities. The correlation element is arranged to correlate the second item with respect to the business categories. The compensation element is arranged to compensate the first business entity for the purchase of the second item. The recordation, advertisement, identification, correlation, and compensation elements are disposed in at least one specially programmed general-purpose computer 316.

Computer 316 is accessed by any means known in the art, for example, via Internet 318. Recordation element 302 can be accessed by any means known in the art, for example, computer 320 and Internet 318. Advertising elements 304 and 306 can advertise using any means known in the art, for example, computers 322 and 324, respectively, and the Internet.

The following should be viewed in light of FIGS. 1 through 4. Any means known in the art can be used to implement systems 10, 100, 200, and 300. In some aspects, the computers shown in the figures are respective servers, which include the elements described in the respective figures, for example, elements 12, 14, and 16, in FIG. 1. Any means known in the art can be used to implement the elements shown in the respective figures. Systems 10, 100, 200, and 300 can be implemented by any combination of software, firmware, and hardware known in the art.

The respective computers used to access systems 10, 100, 200, and 300 can be any type known and the art and can include respective GUIs. Any type of GUI or computer-based element or system capable of interfacing with the Internet can be used to access a present invention system. Other means include, but are not limited to PDAs and cellular telephones.

In general, the respective item associated with the respective sign in the figures is not offered by business 20, 112, 210, or 314, respectively and the respective business does not otherwise have access to, or receive a portion of, revenue related to the sale of the respective item. Thus, the respective present invention systems compensate a respective business entity for downstream revenue generated related to a sign, sold by the respective business, through the system. A respective business entity can be any individual or organization selling respective signs. In some aspects, the business interface with the respective system via the Internet. In some aspects (not shown), the businesses directly interface with the respective computer, for example, computer 22 in FIG. 1.

The compensation or assignment functions described in the figures can be accomplished using any means known in the art. In some aspects a respective compensation or assignation element is interfaced with business entity 20, 112, 210, or 314 through the Internet.

It should be understood that the elements described in the figures, for example, elements 12, 14, and 16 in FIG. 1, represent functions of a respective present invention system and that other functional configurations are included in the spirit and scope of the claimed invention.

Figure 5:
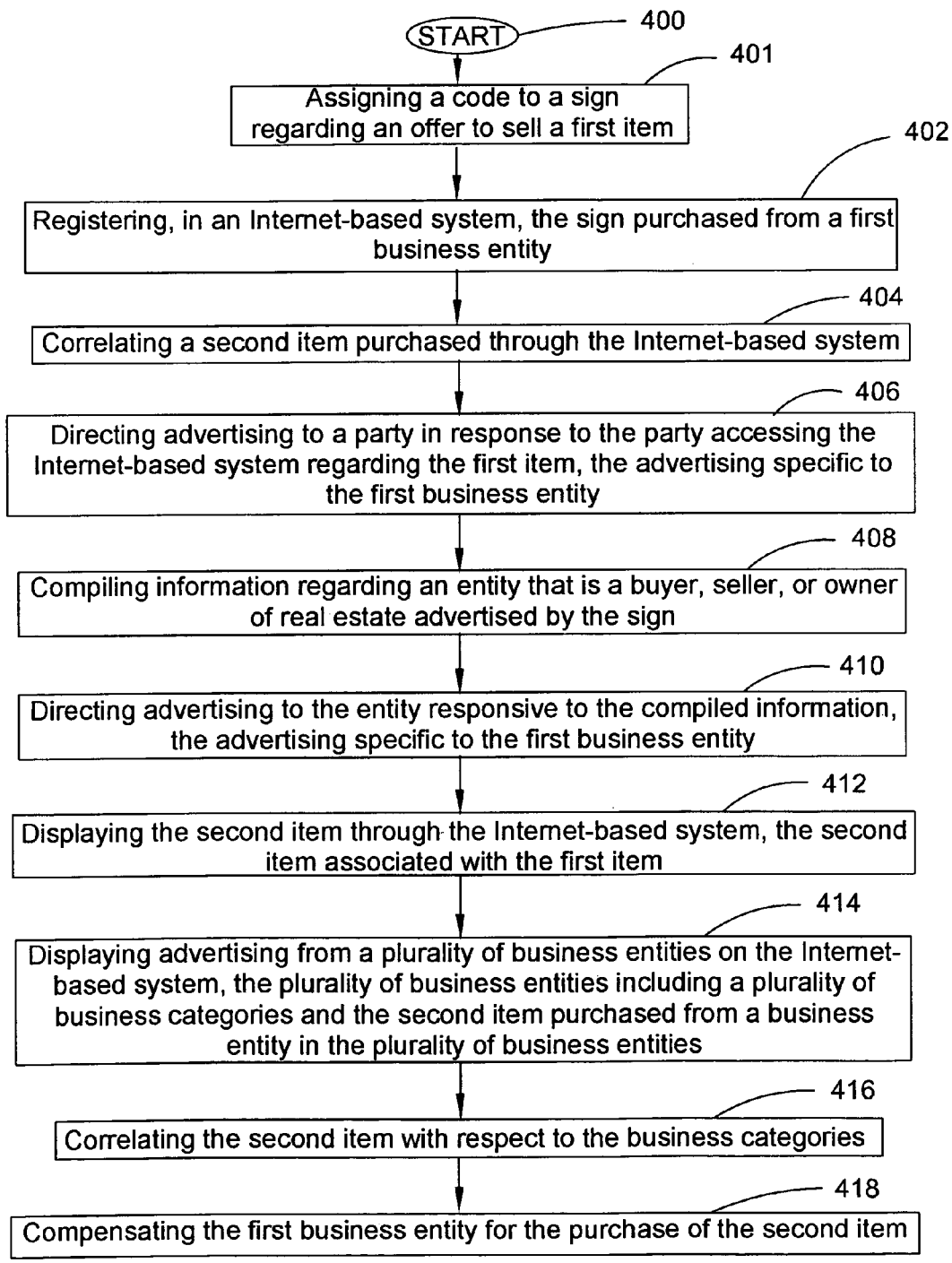
FIG. 5 is a flow chart illustrating a present invention computer-based method for tracking Internet-related revenue.

FIG. 5 is a flow chart illustrating a present invention computer-based method for tracking Internet-related revenue. Although the method in FIG. 5 (and FIGS. 6 through 8 below) is depicted as a sequence of numbered steps for clarity, no order should be inferred from the numbering unless explicitly stated. The method starts at Step 400. Step 402 registers, in an Internet-based system, a sign obtained from a first business entity. Step 404 correlates a first item purchased through the Internet-based system with Step 402, and Step 418 compensates the first business entity for the purchase of the first item.

In some aspects, Step 401 assigns a code to the sign and Step 402 registers the code. In some aspects, the sign is regarding an offer to sell a second item and Step 406 directs advertising to a first party in response to the first party accessing the Internet-based system regarding the second item and the advertising is specific to the first business entity. In some aspects, the second item is real estate and Step 408 compiles information regarding an entity that is a buyer, seller, or owner of the real estate and Step 410 directs advertising to the entity responsive to the compiled information. The advertising is specific to the first business entity.

In some aspects, Step 412 displays the first item through the Internet-based system and the first item is associated with the second item. In some aspects, Step 414 displays advertising from a plurality of business entities on the Internet-based system in response to Step 402, the plurality of business entities includes a plurality of business categories and the first item is purchased from a business entity in the plurality of business entities. Then, Step 416 correlates the first item with respect to the business categories.

In some aspects, the second item is real estate. The above steps are performed by at least one general-purpose computer specially programmed to perform said steps.

Figure 6:
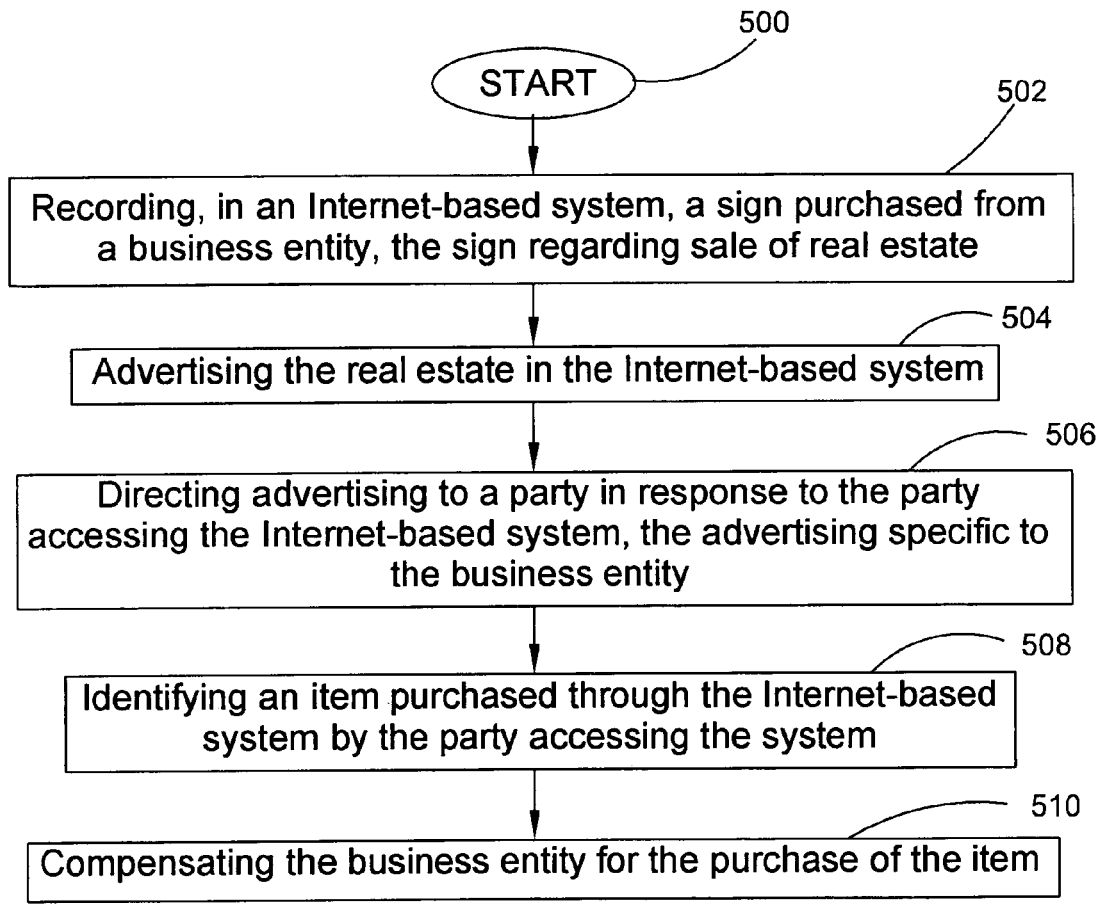
FIG. 6 is a flow chart illustrating a present invention computer-based method for tracking Internet-related revenue.

FIG. 6 is a flow chart illustrating a present invention computer-based method for tracking Internet-related revenue. The method starts at Step 500. Step 502 records, in an Internet-based system, a sign obtained from a business entity, the sign regarding sale of real estate. Step 504 advertises the real estate in the Internet-based system. Step 506 directs advertising to a party in response to the party accessing the Internet-based system and the advertising is specific to the business entity. Step 508 identifies an item purchased through the Internet-based system by the party accessing the system. Step 510 compensates the business entity for the purchase of the item. The above steps are performed by at least one general-purpose computer specially programmed to perform the steps.

Figure 7:
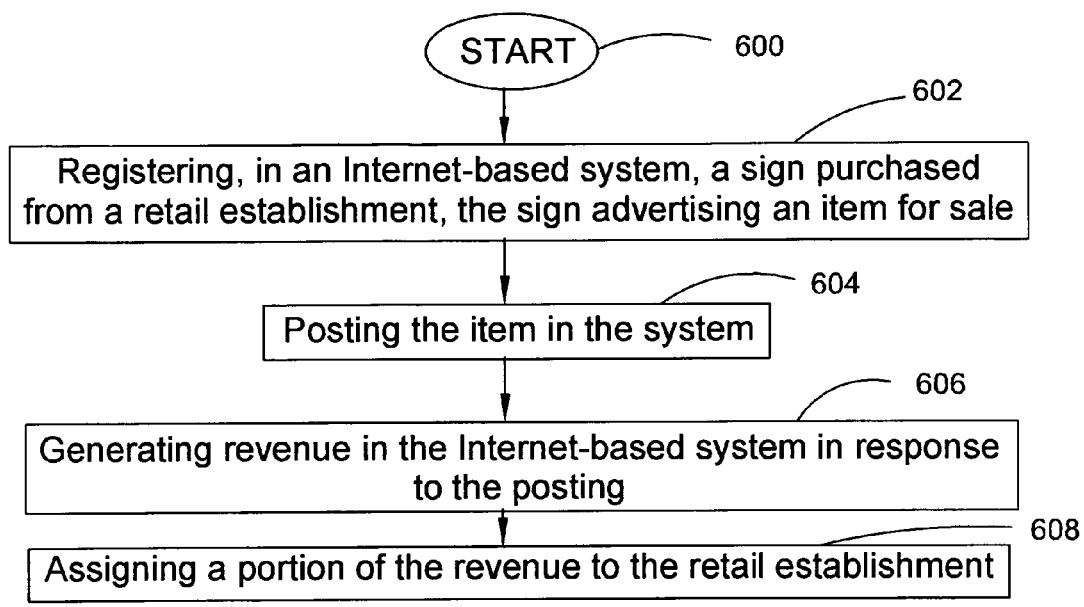
FIG. 7 is a flow chart illustrating a present invention computer-based method for tracking Internet-related revenue; and, FIG. 8 is a flow chart illustrating a present invention computer-based method for tracking Internet-related revenue.

FIG. 7 is a flow chart illustrating a present invention computer-based method for tracking Internet-related revenue. The method starts at Step 600. Step 602 registers, in an Internet-based system, a sign obtained from a retail establishment, the sign advertising an item for sale. Step 604 posts the item in the system. Step 606 generates revenue in the Internet-based system in response to the posting. Step 608 assigns a portion of the revenue to the retail establishment. The above steps are performed by at least one general-purpose computer specially programmed to perform the steps.

Figure 8:
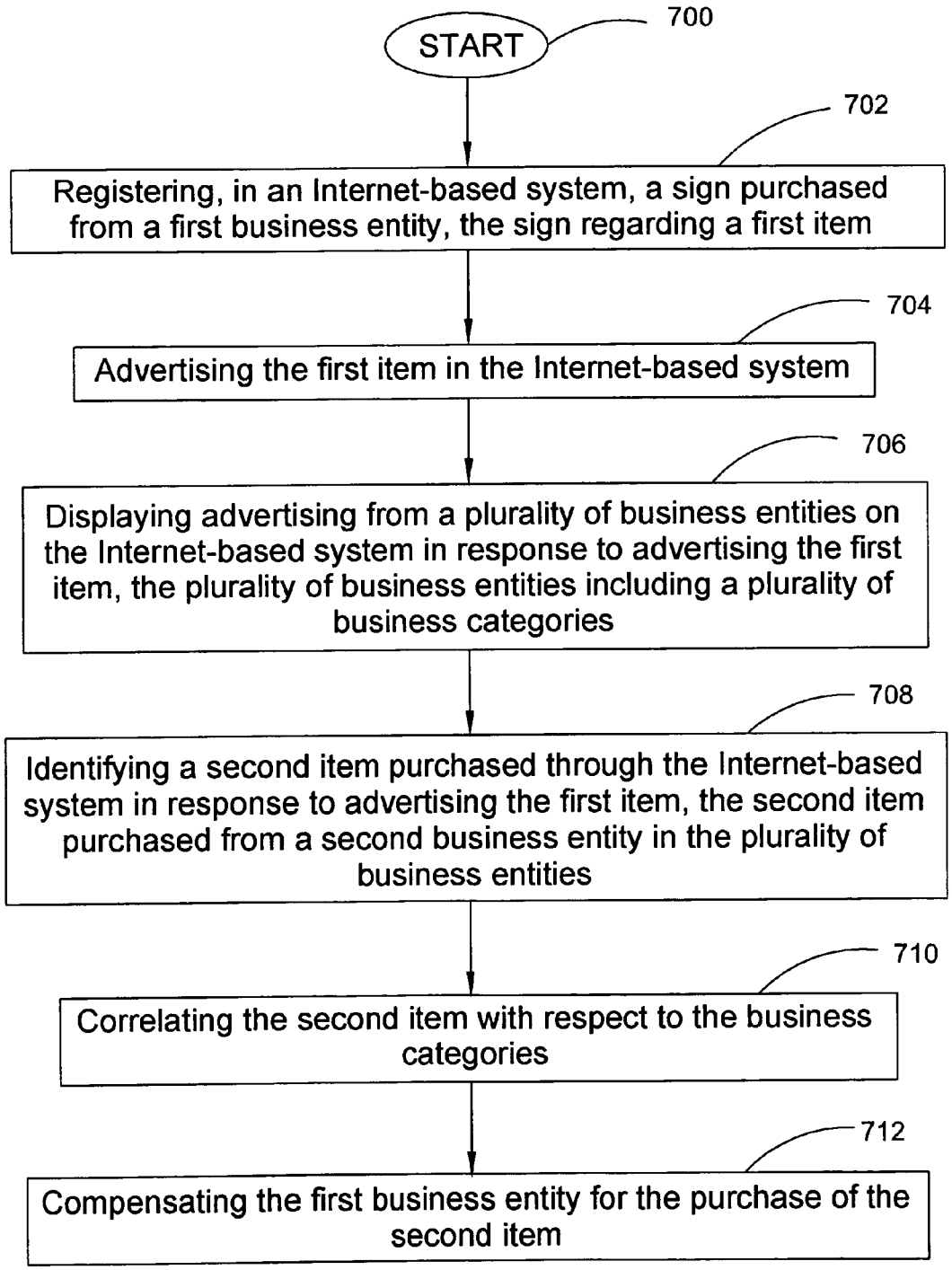

FIG. 8 is a flow chart illustrating a present invention computer-based method for tracking Internet-related revenue. The method starts at Step 700. Step 702 registers, in an Internet-based system, a sign obtained from a first business entity, where the sign is regarding a first item. Step 704 advertises the first item in the Internet-based system. Step 706 displays advertising from a plurality of business entities on the Internet-based system in response to advertising the first item. The plurality of business entities includes a plurality of business categories. Step 708 identifies a second item purchased through the Internet-based system in response to advertising the first item. The second item is purchased from a second business entity in the plurality of business entities. Step 710 correlates the second item with respect to the business categories. Step 712 compensates the first business entity for the purchase of the second item. The above steps are performed by at least one general-purpose computer specially programmed to perform the steps.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A computer-based method for tracking Internet-related revenue, comprising the steps of:

purchasing a "For Sale" sign for first real estate or a kit including a "For Sale" sign for first real estate, from a first business entity, the first business entity having a physical location or building, the first business entity agency being a department store or building supply store, wherein a retail code specific to the first business entity is supplied with the sign or the kit;

implementing, using at least one specially programmed computer, a first log-in to an Internet-based system, the log-in including acceptance of the retail code;

registering, in the Internet-based system, and using the retail code and the at least one specially programmed computer, the "For Sale" sign for the first real estate or the kit including a "For Sale" sign for the first real estate obtained from the first business entity, wherein the registration is part of the first log-in;

advertising, using the at least one specially programmed computer, second real estate in the Internet-based system;

implementing, using the at least one specially programmed computer, a second log-in to the Internet-based system regarding the second real estate;

advertising, using the at least one specially programmed computer, a first item in the Internet-based system responsive to the second log-in;

identifying, using the at least one specially programmed computer, a purchase of the first item from a second business entity, different from the first business entity, through the Internet-based system as part of the second log-in to the Internet-based system;

correlating, using the at least one specially programmed computer and the retail code, the first item purchased through said Internet-based system to said "For Sale" sign or kit; and, compensating, using the at least one specially programmed computer and the retail code, said first business entity for said purchase of said first item.

2. The method of claim 1 said method further comprising: compiling information, using the at least one specially programmed computer, regarding an entity selected from the group consisting of a buyer of said second real estate, a seller of said second real estate, and a second owner of said second real estate; and directing, using the at least one specially programmed computer, advertising to said entity responsive to said compiled information, wherein said advertising is specific to said first business entity.

3. The method of claim 1 further comprising correlating, using the at least one specially programmed computer, a user, purchasing said first item, with said registration.

4. The method of claim 1 wherein the second business entity provides said compensation.

5. The method of claim 1 further comprising displaying, on a display for the at least one specially programmed computer, advertising from a plurality of business entities on said Internet-based system in response to said registration, wherein said plurality of business entities comprises a plurality of business categories and said first item is included in said advertising and wherein correlating a first item purchased through said Internet-based system with said registration further comprises correlating said first item with respect to said business categories.

6. A computer-based system for tracking Internet-related revenue, comprising at least one computer in an Internet-based system specially programmed to:

register a product including a "For Sale" sign for first real estate or a kit including a "For Sale" sign for first real estate purchased from a first business entity, the first business entity having a physical location or building, the first business entity being a department store or building supply store, wherein a retail code specific to the first business entity is supplied with the sign or the kit;

implement a first log-in to the Internet-based system, the log-in including acceptance of the retail code;

register, in the Internet-based system and using the retail code, the "For Sale" sign for the first real estate or the kit including a "For Sale" sign for the first real estate obtained from the first business entity, wherein the registration is part of the first log-in;

advertise second real estate in the Internet-based system;

implement a second log-in to the Internet-based system regarding the second real estate;

advertise a first item in the Internet-based system responsive to the second log-in;

identify a purchase of the first item from a second business entity, different from the first business entity, through the Internet-based system as part of the second log-in to the Internet-based system;

correlate, using the retail code, the first item purchased through said Internet-based system with said sign; and, compensate, using the retail code, said first business entity for said purchase of said first item.

7. The system of claim 6 wherein the at least one computer is specially programmed to compile information regarding an entity selected from the group consisting of a buyer of said second real estate, a seller of said second real estate, and an owner of said second real estate; and wherein the at least one computer is specially programmed to direct advertising to said entity responsive to said compiled information, wherein said advertising is specific to said first business entity.

8. The system of claim 6 wherein the at least one computer includes a display element arranged to display said first item through said Internet-based system.

9. The system of claim 6 wherein the second business entity provides said compensation through said at least one computer.

10. The system of claim 6 wherein the at least one computer is specially programmed to display advertising from a plurality of business entities on said Internet-based system in response to registering the code, wherein said plurality of business entities comprises a plurality of business categories and said first item is displayed in said advertising and said at least one computer is specially programmed to correlate said first item with respect to said business categories.

* * * * *